UNITED STATES PATENT OFFICE.

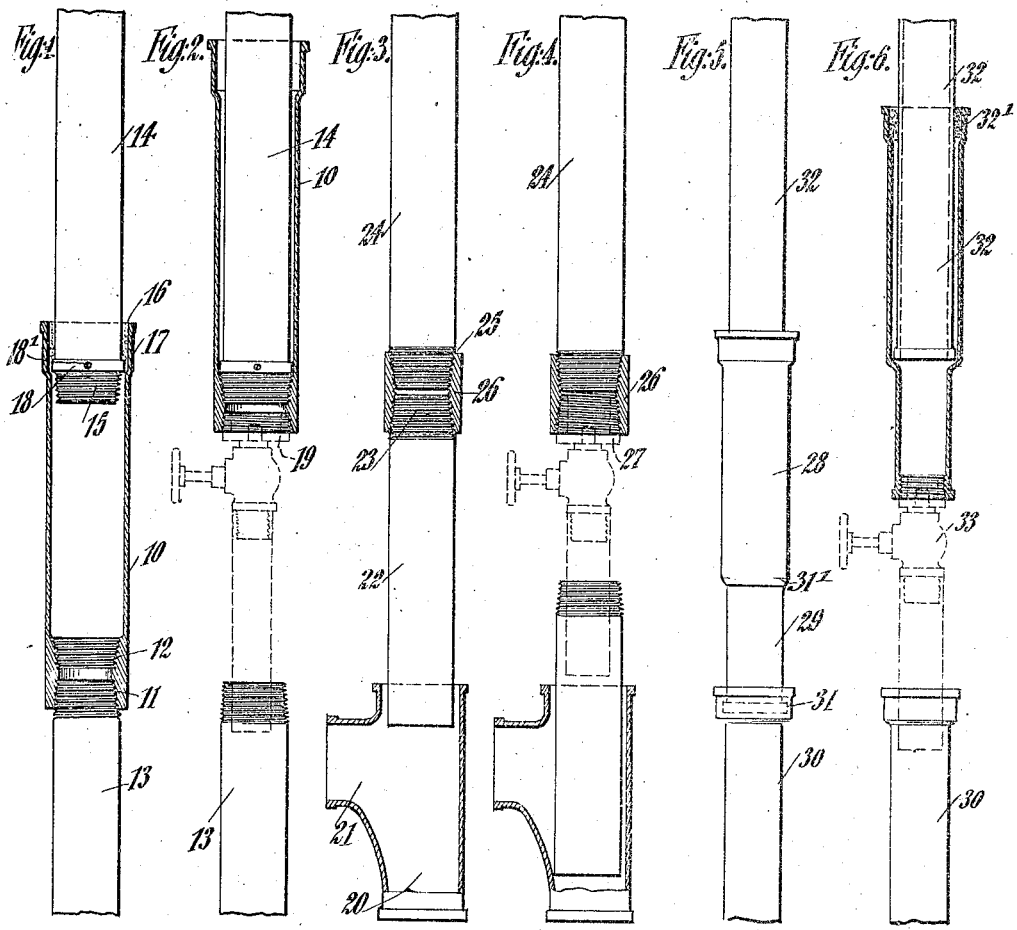
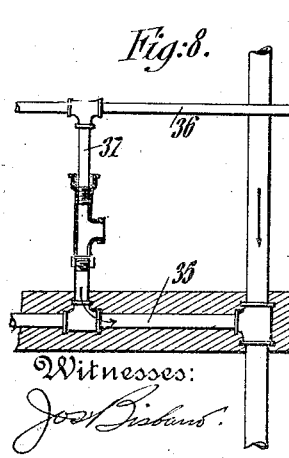
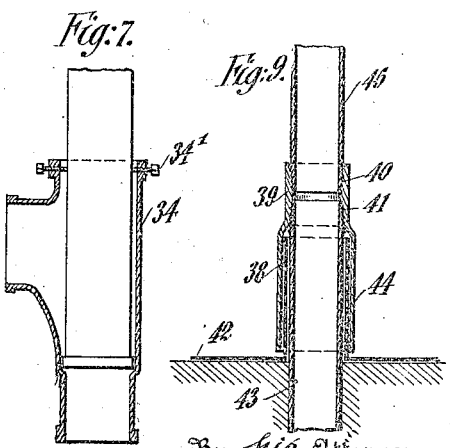

EDWARD KENNEDY, OF NEW YORK, N. Y.

PLUMBING DEVICE.

1,200,851.

Specification of Letters Patent. Patented Oct. 10, 1916.

Application filed April 22, 1915. Serial No. 22,990.

*To all whom it may concern:*

Be it known that I, EDWARD KENNEDY, a citizen of the United States of America, and a resident of the borough of the Bronx, in the city and State of New York, have invented certain new and useful Improvements in Plumbing Devices, of which the following is a specification.

This invention relates to improvements in and relating to plumbing devices, and has for an object to provide an improved plumbing apparatus and devices used in construction of buildings, and particularly a construction of pipes which will enable the plumbing system to be readily and accurately tested.

Another object is to provide a fitting which in case of damage to the pipes or fitting may be readily removed without removing or disassembling the other portions thereof.

A still further object is to provide devices of this character which are simple in construction and inexpensive to manufacture.

With these and other objects in view, my invention consists of the novel features, arrangement and combination of parts, hereinafter more fully described with reference to the accompanying drawings and particularly pointed out in the claims.

In the drawings, Figure 1 is a vertical central section through an improved fitting, whereby a line of pipe of any desired vertical length may be tested; Fig. 2 shows the same fitting in testing position and with the testing device shown in dotted lines therein; Fig. 3 shows a slightly modified fitting which permits the upper section of pipes to be lowered into the same for testing purposes; Fig. 4 shows the same in testing position, and with the testing device shown in dotted lines; Fig. 5 shows a still further modified form embodying my invention in what is known as cast-iron pipe as distinguished from threaded pipe; Fig. 6 is a sectional view showing the same in testing position with the testing device attached thereto; Fig. 7 shows the application of my invention to a cast-iron T, similar to that shown in Fig. 3; Fig. 8 shows a diagrammatic view of a plumbing system embodying my invention and having a waste-pipe and a vent-pipe; and Fig. 9 shows the adaptation of the same fitting for the purpose of making a tight connection of the vent-pipe and waste-pipe or pipes with the tin roof of the building.

Similar reference characters indicate corresponding parts throughout the several figures of the drawing.

In the construction of buildings, it is desirable and necessary to test the waste-pipes, vent-pipes, and other pipes employed in the system of plumbing in the building at intervals of say ten stories, buildings of higher construction requiring a double testing of the lower stories on account of the greater pressure. When the pipe is built up solid length after length, there is at the present time no method of testing the different lengths without cutting the pipe, or plugging it, or otherwise breaking into it, except what is known as the "Tucker fitting", which, however, compels the springing sidewise of one or both ends at the point of separation in order to open the pipe, one of the open ends being then closed for testing or else it was necessary to employ a fitting having an enlarged portion with a lateral port, which, after the testing was completed, was closed by a plug, all of which was very unsightly and cumbersome. With these old methods it is very often necessary also to remove portions of the pipe and lay the same lengthwise on the floor, thereby causing great inconvenience, especially where the house is occupied. The new fitting, which forms the subject matter of my invention, avoids these difficulties, and provides means for testing a pipe without removing any portions thereof, and without requiring the same to be sprung sidewise as with the "Tucker fitting", and enables the testing to be carried out in less time and with less expense than has heretofore been possible.

Referring to the drawings, my invention comprises an elongated sleeve 10 having its lower end internally threaded along the tapered portion 11 in upward direction. The said thread is, therefore, not a running thread, but a standard pipe thread, as is customary with such threaded iron pipes. The said sleeve 10 is also provided above the thread 11 with another thread 12 oppositely tapered, as shown in Fig. 1.

In the process of erection of the building, a lower pipe 13 is threaded into the threaded portion 11 of the fitting 10, and an upper pipe 14 is then put in place, that is to say, it is slipped into the sleeve 10, the said upper pipe having at its lower end a thread 15 adapted to engage the thread 12 of the sleeve 10. The calking 16 in the hub 17 of the sleeve 10 is not put in place until after the testing has been made in the pipes 14 and in the upper lengths connected therewith. The construction of the pipe system above the pipe 14 is continued to as high an elevation as may be desired, in the position shown in Fig. 1 by means of a pipe clamp or other suitable support. A ring 18 is secured stationary to the lower end of the pipe 14 by means of a screw 18', the pipe 10 sliding over the said ring during the testing, and when the system is completed, making a tight joint between the pipe 14 and the pipe 10 for the purpose of preventing the packing 16 from entering the pipe 10. When the test is to be made, after the pipe 14 is in position and the upper lengths of pipe are erected, the sleeve 10 is unscrewed from the pipe 13 and raised by hand from the pipe 14 until the thread 12 engages the thread 15. The sleeve 10 is then screwed in place on the pipe 14 in the position shown in Fig. 2, and is retained suspended on the said pipe by engagement of the threads 12 and 15, which make a water-tight connection. A plug 19 having a valve-pipe extending into the pipe 13, shown in dotted lines, is now inserted in the exposed lower end of the sleeve 10, which plug engages the thread 12 of the sleeve, and thereby closes the lower end of the sleeve and of the pipe 14. Water is now admitted from any suitable source into the pipe 14, and the pipe system above it, and the test is observed, a convenient method of filling the house system being to connect a water-supply pipe to the valve carried by the plug 19. When the test is completed, and it is desired to discharge the water contained in the pipe 14 and the upper lengths of pipe, the valve 19 is opened, and thereby the water is discharged through said valve and through the pipe carried by the same into the lower pipe 13, after which any repairs necessary may be made. The plug 19 is then removed and the fitting 10 is lowered to the position shown in Fig. 1, after which the calking 16 is placed around the pipe 14 within the hub 17, completing a water-tight connection. It will be seen that should at any subsequent time a test be desirable, the calking might readily be removed and the test carried out as above described, and without necessitating the removal of any pipes or the springing sidewise of the same.

In Figs. 1 and 2, I have shown a pipe 13 which is connected to the lower end of the fitting, but, if desired, a cast-iron pipe having a hub or a T or any suitable fitting may be employed, it being immaterial whether the lower pipe be the one required to be calked to the sleeve after the test or screwed thereto. The sleeve 10 remains a permanent part of the pipe line, and the latter may at any time be tested in the manner described. The sleeve described provides a convenient and ready means of testing any desired length of superposed pipe. It is advantageous not only when the plumbing system is erected as a whole in exposed condition before the inclosing of the same in brickwork or plaster, but it is also convenient for testing isolated lengths of erected pipes, where it is necessary to test such lengths independently of others, and because of the brick and other inclosing material being ready to be applied to that particular stretch of pipe. This is especially true in connection with buildings of steel construction, wherein the whole framework of the building is erected and the brickwork is put up in sections at different times. Thus, independent portions of the entire system may be tested at any desired time, and the coöperation between the plumbing and bricklaying construction of the building is greatly facilitated, and the erection of the building is hastened.

In Figs. 3 and 4, I have shown an improved T, which may be used in place of the fitting 10 above described. The T comprises a lower arm 20 provided with a standard pipe thread and a horizontal arm 21 leading to the fixture, such for instance as a basin or bowl. A pipe 22 is inserted in the upper end of the T, and is provided at its upper end with the tapered thread 23, an upper length of pipe 24 having at its lower end a tapered thread 25 being connected thereto by means of an ordinary pipe coupling 26, which is internally threaded from opposite ends to correspond to the thread of the pipes 22 and 24, or the pipe 22 may be full length and screwed into a fitting provided in the floor above. In this form of construction, to be tested, the same is erected as shown in Fig. 3 without any calking between the T and the pipe 22. The pipe 22 is removed by hand from the coupling 26, and is lowered into the T. A testing fitting 27 provided with a plug, valve and pipe similar to that of the testing fitting 19 is then screwed into the coupling 26, thereby closing and making a water-tight connection at the exposed end of the pipe 24. In this position the same is tested as pointed out with reference to Figs. 1 and 2, and after the test is completed, the testing fitting 27 is removed, the pipe 22 is again screwed into the coupling 26, and the joint between the said pipe and the T is calked to form a water-tight connection.

In Figs. 5 and 6, I have shown a further modified form of construction as applied to the cast-iron form of pipe, a fitting 28 being provided having its lower end 29 of smaller diameter than the upper end, so as to fit into a hub 31 of a lower length of pipe 30. The lower end of the said pipe 28 is interiorly threaded for receiving the testing fitting 33 shown in Fig. 6, the said pipe 28 being held in position during the testing on the pipe 32 by means of calking 32′, which is easily removed by tapping after the test. This fitting is a very convenient form for leader lines where the pipe runs straight up through the building for a considerable height, permitting the same to be readily tested at different portions thereof, and if a damaged length of pipe is to be removed, this may be done without necessitating the removal of several others.

In Fig. 7, I have shown an improved cast-iron T 34, which may be used in the construction shown in Figs. 3 and 4, in place of the threaded T 20, having its end adapted to be calked into a fitting or length of pipe. Screws 34′ are provided in the said T, which hold the upper pipe in raised position after the test, while the upper joint is being calked, after which the screws are unscrewed from the pipe and the joint is packed with oakum. If desired, a pipe clamp may be used instead of the screws 34′. The screws are then tightened against the pipe and the joint is run with lead. This fitting may, if desired, be made of the standard size pipe length.

In Fig. 8, I have shown my invention as applied to a system of piping having a discharge-pipe 35 and a vent-pipe 36. It will be seen that with this construction it is only necessary to employ one pipe 37 connecting the vent-pipe to the T, whereas heretofore it was necessary to employ right and left nipples and right and left couplings, and a right nipple, to enable the same to be tested thereafter. It was also necessary that there be a certain amount of "give" or spring between the vent-pipe and the T, in order to make the proper connection; whereas, with my improvements, the single pipe 37 is first screwed into the T and then carried back into the fitting, the long running thread on the same giving sufficient spring to the pipe to allow for any inaccuracies in the alinement of the various parts. The lower end of the pipe 37 and the T may be threaded or not as desired, in the latter case more spring being given to the pipe than in the case of the threaded connection.

In Fig. 9, the principle of my invention is applied to a roof connection. A pipe 38 similar to the pipe 28 shown in Figs. 5 and 6 is provided, which has a contracted end 39 and internally tapered threads 40 and 41, the same being substantially the construction shown in Figs. 1 and 2 in inverted position. The roof 42 has an opening through which the last length of pipe 43 projects upwardly. It is necessary to carry the discharge end to a considerable height above the roof, however, and it is also necessary to make a tight connection between the flashing 44 on the roof and the pipe 43. To this purpose, the pipe 38 is threaded onto the upper end of the pipe 43 after the flashing is in place around the said pipe, and the upper length of the pipe 45 being then screwed into the upper end of the pipe 38, the said pipe 45 extending the desired height above the roof. By reason of the pipe 38 thus overlapping the flashing, a secure protection is afforded against the ingress of rain or moisture of any kind from the outside of the roof.

I have illustrated and described preferred and satisfactory forms of my invention, but it is obvious that changes may be made therein within the spirit and scope thereof as defined in the appended claims.

I claim:—

1. A plumbing testing fitting of the character described, comprising a solid non-expansible sleeve having a reduced end, the said reduced end adapted to form a double shoulder within the sleeve and a hub at the opposite end of said sleeve.

2. A plumbing fitting of the character described, comprising a solid non-expansible sleeve having a reduced end with oppositely disposed pipe threads in said end, and a hub at the opposite end of said sleeve.

3. The combination with a testing fitting, comprising a plug, a valve on said plug and a discharge pipe on said valve, of a fitting comprising a sleeve having a reduced end and oppositely disposed pipe threads in said reduced end, the lowermost threads adapted to be engaged by the plug of the said testing fitting.

4. The combination, with means for supporting an upper length of pipe in fixed vertical position, and means for supporting a lower length of pipe in fixed vertical position, and a testing fitting, said upper length of pipe having an external pipe thread at its lower end, of a sleeve loosely fitting on said upper pipe and adapted to span the distance between the pipes, and having a contracted portion below the lower end of the upper pipe, and internal pipe thread in said contracted portion adapted to engage the thread on the upper pipe when the sleeve is raised thereon, the said testing fitting adapted to close the lower end of said sleeve when in raised position, means for connecting the sleeve permanently with the lower pipe, and means for connecting the sleeve permanently with the upper pipe.

In testimony, that I claim the foregoing as my invention, I have signed my name in presence of two subscribing witnesses.

EDWARD KENNEDY.

Witnesses:
 Jos. BISBANO,
 DENIS MATTERN.